United States Patent [19]

Lee

[11] Patent Number: 5,627,814

[45] Date of Patent: May 6, 1997

[54] OPTICAL PICKUP SYSTEM FOR READING INFORMATION RECORDED ON AN OPTICAL DISK HAVING MULTIPLE RECORDING SURFACES

[75] Inventor: Kwang-Suk Lee, Seoul, Rep. of Korea

[73] Assignee: Daewoo Electronics Co., Ltd., Seoul, Rep. of Korea

[21] Appl. No.: 578,303

[22] Filed: Dec. 26, 1995

[30] Foreign Application Priority Data

Dec. 27, 1994 [KR] Rep. of Korea ............. 94-37245

[51] Int. Cl.$^6$ .................................................. G11B 7/00
[52] U.S. Cl. ..................... 369/116; 369/94; 369/44.37
[58] Field of Search .............................. 369/116, 110, 369/112, 94, 120, 44.37, 44.38

[56] References Cited

U.S. PATENT DOCUMENTS

| | | | |
|---|---|---|---|
| 5,150,347 | 9/1992 | Yanagi | 369/44.37 |
| 5,161,243 | 11/1992 | Ishida et al. | 369/44.37 |
| 5,251,198 | 10/1993 | Strickler | 369/110 |
| 5,295,125 | 3/1994 | Oonishi et al. | 369/44.37 |
| 5,341,355 | 8/1994 | Gotoh et al. | 369/44.37 |
| 5,487,058 | 1/1996 | Kitabayashi | 369/112 |

*Primary Examiner*—Loha Ben
*Attorney, Agent, or Firm*—Pennie & Edmonds LLP

[57] ABSTRACT

An optical pickup system for reproducing an information signal stored on an optical disk, including a pair of recording surfaces thereon, is provided with a pair of light sources for generating a first and a second light beams having different wavelength, $\lambda_1$, $\lambda_2$, a detector, an objective lens, a signal detection unit and a beam splitter having a first and a second surfaces, wherein the first surface of the beam splitter is pervious to the light beam having a wavelength other than $\lambda_1$ and the second surface of the beam splitter is pervious to the light beam having a wavelength other than $\lambda_2$. In the system, while the first light source is used for reproducing the information signal off the first recording surface of the optical disk, the first light beam transmitted from the second surface of the beam splitter is used for detecting the focusing error signal of the first recording surface of the optical disk. When the second light source is used for detecting the focusing error signal of the second recording surface of the optical disk, the second light beam reflected from the second surface of the beam splitter is utilized for reproducing the information signal off the second recording surface with the first light source turned off.

19 Claims, 3 Drawing Sheets

OPTICAL PICKUP SYSTEM FOR READING INFORMATION RECORDED ON AN OPTICAL DISK HAVING MULTIPLE RECORDING SURFACES

FIELD OF THE INVENTION

The present invention relates to an optical pickup system; and, more particularly, to an improved optical pickup system capable of providing an increased optical efficiency.

DESCRIPTION OF THE PRIOR ART

One of the common difficulties associated with an optical information recording disk having multiple recording surfaces lies in the construction of an optical pickup system.

In FIG. 1, there is shown an optical pickup system 100 capable of reproducing a signal from an information storage area on an optical disk having multiple recording surfaces, disclosed in a copending, commonly owned applications U.S. Ser. No. 08/556,684, filed Nov. 13, 1995 entitled "OPTICAL PICKUP SYSTEM FOR USE WITH AN OPTICAL DISK HAVING MULTIPLE RECORDING SURFACES", the optical pickup system including: a first and a second light sources 110, 112, the first and the second light sources generating a first and a second light beams, respectively, having different wavelengths, $\lambda_1$, $\lambda_2$, a beam splitter 120 provided with a pair of surfaces 122, 124, each of the surfaces 122, 124 being capable of reflecting a portion of the light beams and transmitting the remaining portion thereof, an objective lens 130, an optical disk 50 including a first and a second recording surfaces 54, 58, a detector 140 provided with a first and a second photoelectric cells 142, 144 and a signal detection unit 150 including a pair of input ports.

In the system 100, when the first light source 110 reproduces a recorded information signal on the first recording surface 54 of the optical disk 50, the second light source 112 is turned off. In this case, the first light beam emitted from the first light source 110, e.g., a laser diode, enters the beam splitter 120. The first light beam passes partially through the second surface 124 incorporated in the beam splitter 120 to thereby produce a transmitted first light beam. The transmitted first light beam is focused onto the first recording surface 54 through the second recording surface 58 by the objective lens 130, wherein the second recording surface 58 is pervious to the light beams having a wavelength other than $\lambda_2$. The transmitted first light beam focused onto the first recording surface 54, which reflects only the light beam having the wavelength $\lambda_1$ and passes through the other light beams having different wavelengths, is reflected back to the objective lens 130 through the second recording surface 58. The reflected first light beam impinges onto the first surface 122 of the beam splitter 120. The reflected first light beam from the first surface 122 of the beam splitter 120 is then reflected to the detector 140 to thereby allow the detector 140 to receive the reflected first light beam as an output signal.

The detector 140 includes the first and second photoelectric cells 142, 144, being capable of generating an output in the form of a light beam intensity measurement. Outputs from the first and second photoelectric cells 142, 144 are sent to the pair of input ports on the signal detection unit 150 which generates a focusing error signal by comparing the outputs from the first and second photoelectric cells 142, 144 of the detector 140.

Meanwhile, in order to reproduce recorded information from the second recording surface 58, the detector 140 reads the recorded information signal from the second recording surface 58 of the optical disk 50 with the second light source 112 turned on. In this case, the second light beam emitted from the second light source 112, e.g., a laser diode, enters the beam splitter 120, and is partially reflected by the second surface 124 incorporated in the beam splitter 120 into the objective lens 130. A portion of the second light beam is then focused by the objective lens 130 and impinges onto the second recording surface 58, which is pervious to the light beams having a wavelength other than $\lambda_2$. The portion of the second light beam focused onto the second recording surface 58 is reflected back to the objective lens 130 to thereby produce a reflected second light beam. The reflected second light beam is partially reflected to the detector 140 by the first surface 122 to thereby produce a focusing error signal for the second recording surface 58 of the optical disk 50.

In such a system, the intensity of the light beam impinging on a reception surface of the detector, i, may be determined as:

$$i = rI \ast k \ast R_S^2 \ast R_O^2$$

wherein I represents the light source intensity, r, the radiation loss factor, k, the loss factor of the beam splitter serving as a knife edge, $R_S$, the loss factor of the beam splitter, and $R_O$, the loss factor of the objective lens. If r, I, k, $R_S$ and $R_O$ are 0.8, 0.3, 0.5, 0.5 and 0.97, respectively, then i becomes 0.028 mW. In this optical pickup system, half of the light beam is obstructed by the first and the second surfaces of the beam splitter, thereby reducing the optical efficiency of the light beam.

SUMMARY OF THE INVENTION

It is, therefore, a primary object of the present invention to provide an optical pickup system with an improved optical efficiency capable of reading information recorded on an optical disk having multiple recording surfaces.

In accordance with the present invention, there is provided an optical pickup system for reproducing information stored on an optical disk including a first and a second recording surfaces, each of the recording surfaces having a plurality of tracks aligned spirally or concentrically, the optical pickup system comprising: a pair of light sources for generating a first and a second light beams, respectively, each of the light beams having different wavelengths, and each of the light sources being placed opposite each other; a detector placed opposite the optical disk, the detector being provided with a pair of photoelectric cells, each of the photoelectric cells being capable of measuring a light beam intensity and generating a corresponding output signal; a beam splitter, disposed between the optical disk and the detector, provided with a first and a second surfaces, the first surface being pervious to the light beams having a wavelength other than the wavelength of the first light beam and the second surface being pervious to the light beam having a wavelength other than the wavelength of the second light beam, the first and the second surfaces arranged in such a way that they are inclined at a predetermined angle with respect to an optical axis formed by a center point of the detector and respective convergence points of the first and the second light beams, the convergence point of the first light beam referring to a point on the first reflection surface on which the first light beam converges, and that of the second light beam referring to a point on the second reflection surface on which the second light beam converges, wherein the first light beam from the first light source is reflected to the first recording surface of the optical disk by the first surface of the beam splitter, the first light beam reflected from the first recording surface travels toward the detector via the second surface of the beam splitter, the second light beam from the second light source is reflected to the second recording surface of the optical disk by the second surface of the beam splitter, the second light beam reflected by the second recording surface impinges onto the detector via the first surface of the beam splitter to thereby allow the detector to generate selectively a corresponding output signal in response to the information from each of the recording surfaces of the optical disk; an objective lens, disposed between the beam splitter and the optical disk, for focusing each of the light beams from the beam splitter and for converging each of the light beams reflected from each of the first and the second recording surfaces onto the surfaces of the beam splitter, respectively; and a signal detection unit, connected to the photoelectric cells of the detector, for generating a focusing error signal by comparing the output from each of the photoelectric cells.

BRIEF DESCRIPTION OF THE DRAWINGS

The present invention together with the above and other objects and advantages will become apparent from the following description of preferred embodiments, when given in conjunction with the accompanying drawings, wherein.

DETAILED DESCRIPTION OF THE PREFERRED EMBODIMENTS

Figure 1:
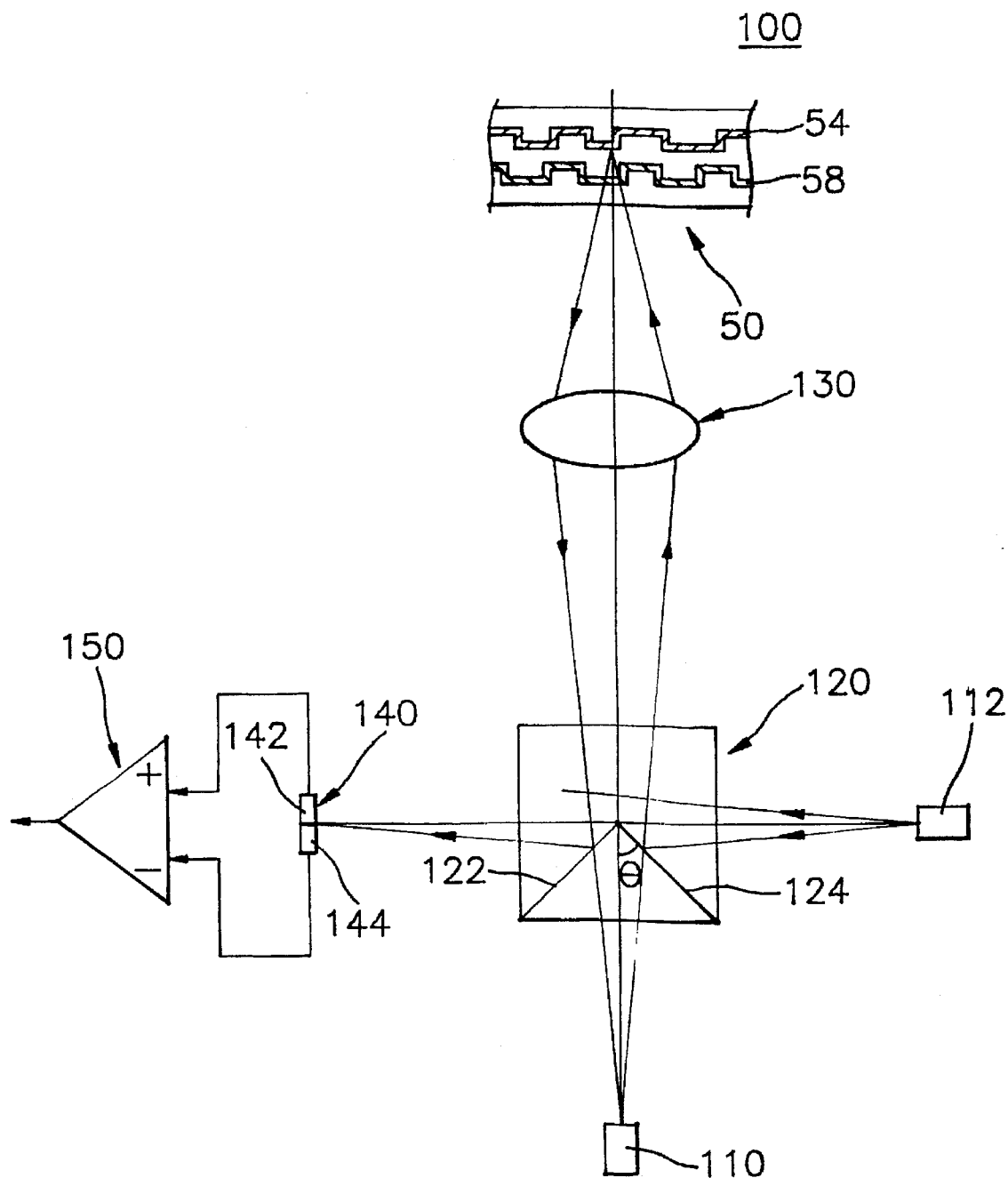
FIG. 1 represents a schematic side view of a prior art optical pickup system.
Figure 2:
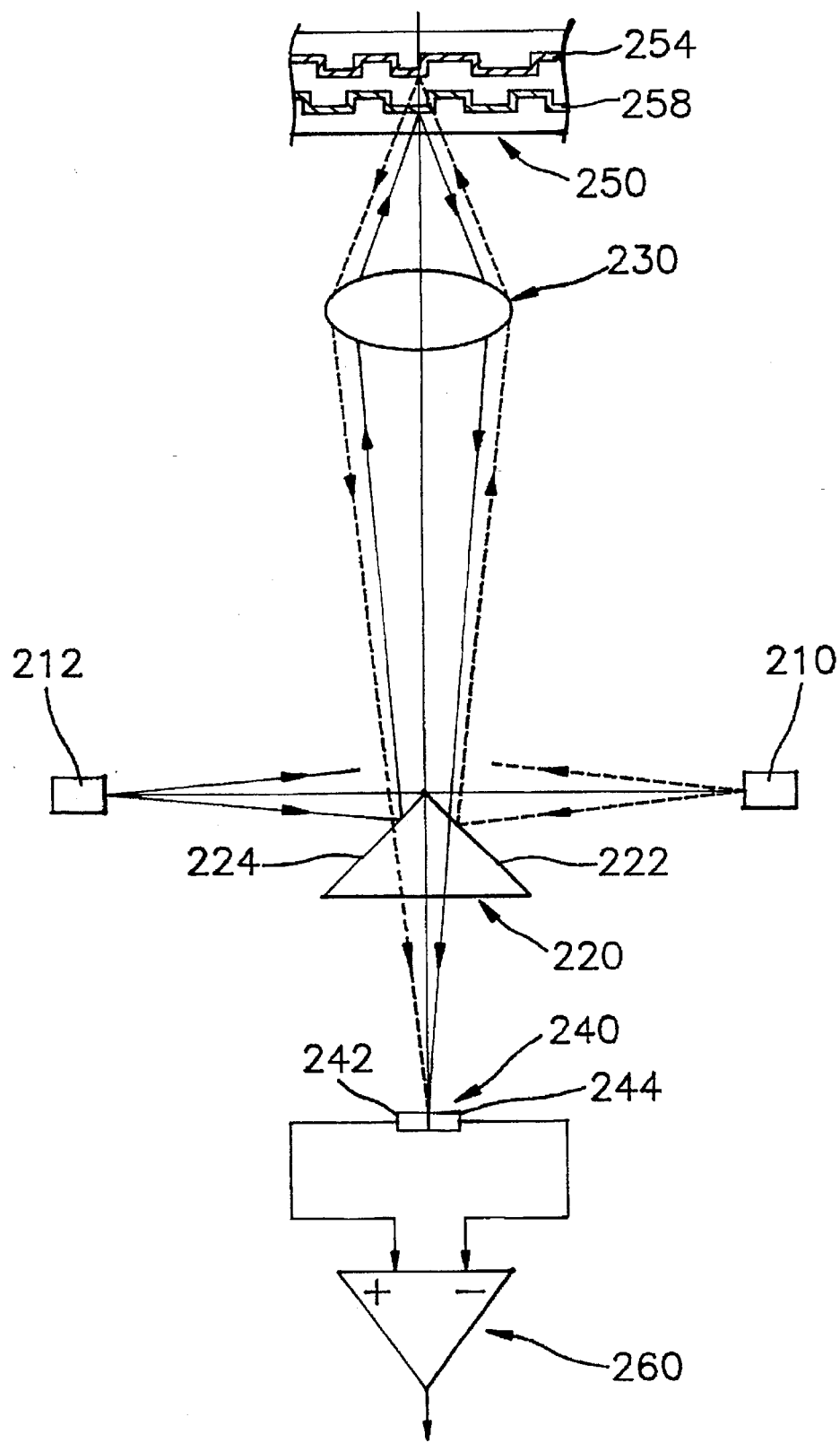
FIG. 2 depicts a schematic side view of an optical pickup system in accordance with a preferred embodiment of the present invention.
Figure 3A:
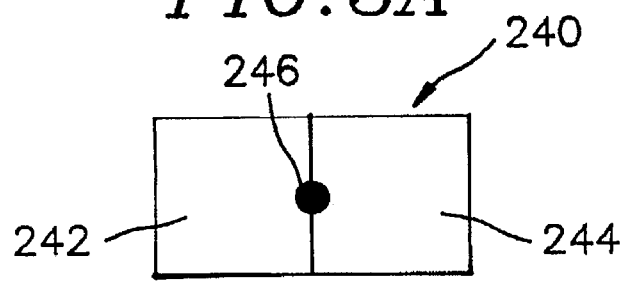
FIGS. 3A–3C exemplify beam spots impinging onto the reception surface of the detector.
Figure 3B:
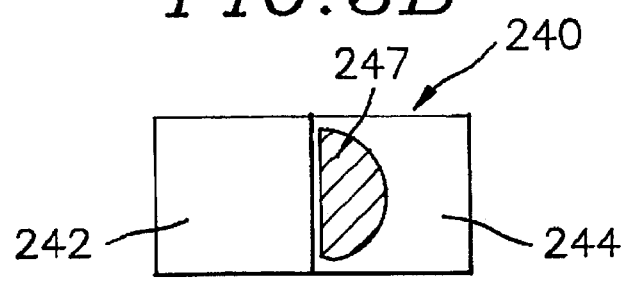
Figure 3C:
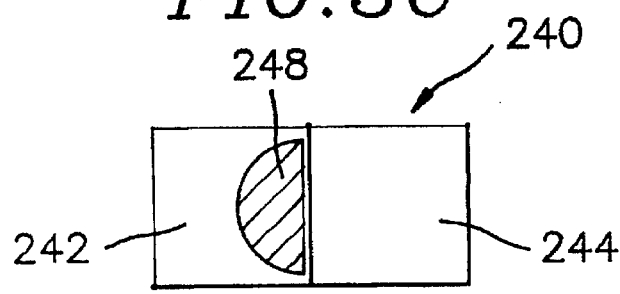
Figure 4:
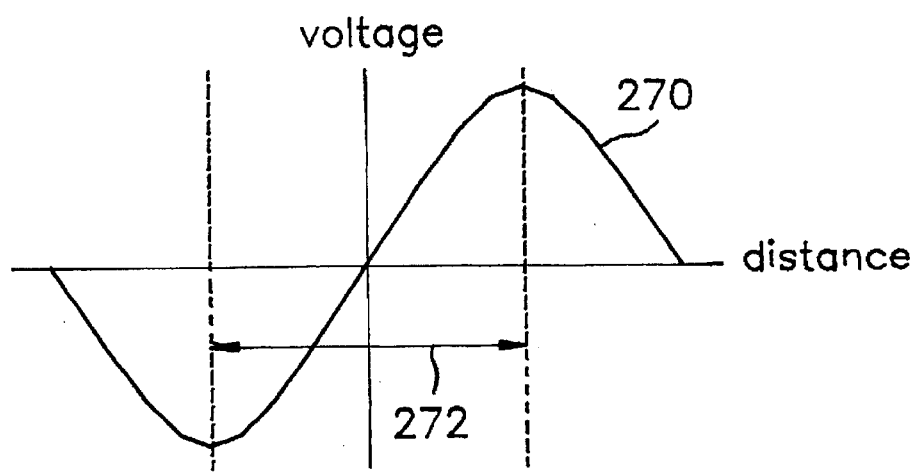
FIG. 4 shows the relationship between a displacement of the optical disk and an intensity variation of a focusing error signal.

There are illustrated in FIGS. 2 to 4 various views of the inventive optical pickup system in accordance with a preferred embodiment of the present invention.

As shown in FIG. 2, the optical pickup system 200 in accordance with the present invention includes a first and a second light sources 210, 212, the first and the second light sources generating a first and a second light beams, respectively, having different wavelengths, $\lambda_1$, $\lambda_2$, a beam splitter 220 provided with a first surface 222 being pervious to the light beam having a wavelength other than $\lambda_1$ and the second surface 224 being pervious to the light beam having a wavelength other than $\lambda_2$, an objective lens 230, an optical disk 250 including a first and a second recording surfaces 254, 258, a detector 240 provided with a first and a second photoelectric cells 242, 244 and a signal detection unit 280 including a pair of input ports.

In the system 200, when the first light source 210 reproduces a recorded information signal on the first recording surface 254 of the optical disk 250, the second light source 212 is turned off. In this case, the first light beam emitted from the first light source 210, e.g., a laser diode, enters the first surface 222 of the beam splitter 220. The beam splitter 220 is arranged in such a way that the first and the second surfaces thereof are inclined at a predetermined angle with an optical axis formed by a center point of the detector 240 and respective convergence points of the first and second light beams. The convergence point of the first light beam refers to a point on the first recording surface 254 on which the first light beam converges, and that of the second light beam, a point on the second recording surface 258 on which the second light beam converges. It is preferable that the angle be 45 degrees. A portion of the first light beam is reflected to the objective lens 230 by the first surface 222 incorporated in the beam splitter 220. The reflected first light beam is focused onto the first recording surface 254 of the optical disk 250 by the objective lens 230, wherein the reflected first light beam passes through the second recording surface 258 which is pervious to the light beams having a wavelength other than $\lambda_2$. The focused first light beam is reflected back to the objective lens 230 by the first recording surface 254 through the second recording surface 258 of the optical disk 250. The objective lens 230 converges the reflected first light beam onto the detector 240 via the second surface 224, which reflects only the light beam having the wavelength $\lambda_2$ and passes through the other light beams having different wavelengths, thereby allowing the detector 240 to receive the reflected first light beam as an output signal.

Meanwhile, the remaining portion of the first light beam passing through the beam splitter 220 travels toward the second light source 212 to thereby prevent the detector 240 from receiving the remaining portion of the first light beam as an output signal.

As can be seen from the above, the edge line formed by the intersection of the first and second surfaces 222, 224 of the beam splitter 220 serves as a conventional knife edge. The detector 240 includes the first and second photoelectric cells 242, 244. Each of the photoelectric cells 242, 244 is capable of generating an output in the form of a light beam intensity measurement. Outputs from the first and second photoelectric cells 242, 244 are sent to the pair of input ports on the signal detection unit 260 which generates a focusing error signal by comparing the outputs from the first and second photoelectric cells 242, 244 of the detector 240.

FIG. 3A shows the beam spot 246 impinging on the first and second photoelectric cells 242,244 when the optical disk 250 is placed at a precisely focused position, generating a zero focusing error signal. If the optical disk 250 moves away from the focused position, i.e., from the objective lens 230, the beam spot 247 impinges onto the second photoelectric cell 144 as shown in FIG. 3B. In the case when the optical disk 250 moves closer to the objective lens 230, the beam spot 248 impinges onto the first photoelectric cell 242, as illustrated in FIG. 3C.

Referring back to FIG. 2, in order to reproduce a recorded information signal from the second recording surface 258, the detector 240 reads the recorded information signal from the second recording surface 258 of the optical disk 250 with the second light source 212 turned on. It should be noted that in the optical system 200 of the present invention shown in FIG. 2, the dot line representing the optical path of the first light beam is exaggerated for the sake of illustration. In this case, a portion of the second light beam emitted from the second light source 212, e.g., a laser diode, enters the beam splitter 220, and is reflected by the second surface 224 incorporated in the beam splitter 220 into the objective lens 230. The reflected second light beam is then focused by the objective lens 230 onto the second recording surface 258, which is pervious to the light beams having a wavelength other than $\lambda_2$. The focused second light beam is reflected back to the objective lens 230 to thereby produce a reflected light beam. The reflected light beam is transmitted to the detector 240 through the objective lens 230 and the first surface 222 of the beam splitter 220 to thereby produce a focusing error signal for the second recording surface 258 of the optical disk 250.

Meanwhile, the remaining portion of the second light beam passing through the second surface 224 of the beam splitter 220 travels toward the first light source 210 to thereby prevent the detector 240 from receiving the remaining portion of the second light beam as an output signal. It should be noted that the other processes for detecting the focusing error signal of the second recording surface 258 are similar to those of the first recording surface 254.

In the system 200, the intensity of the light beam impinging on a reception surface of the detector 240 may be calculated using the following relationship:

$$i = rI*k*R_o^2$$

wherein, I represents the light source intensity, r, the radiation loss factor, k, the loss factor of the knife edge, $R_o$, the loss factor of the objective lens. If the r, I, k and $R_o$ are 0.8, 0.3, 0.5 and 0.97, respectively, then i is 0.1129 mW. The intensity of the light beam impinging on the reception surface of the present invention is, therefore, 4 times larger than that of the prior art.

In FIG. 4, there is illustrated a focusing error detecting signal curve 270 measured as a function of voltage and displacement. The arrow 272 therein indicates that the focus centrol distance range is about 15 µm.

While the present invention has been described with respect to the preferred embodiments, other modifications and variations may be made without departing from the spirit and scope of the present invention as set forth in the following claims.

What is claimed is:

1. An optical pickup system for reproducing an information signal stored on an optical disk including a first and a second recording surfaces, each of the recording surfaces having a plurality of tracks aligned spirally or concentrically, comprising:

a pair of light sources for generating a first and a second light beams, respectively, each of the light beams having different wavelengths, and each of the light sources being placed opposite each other;

a detector placed opposite the optical disk, the detector being provided with a pair of photoelectric cells, each of the photoelectric cells being capable of measuring a light beam intensity and generating a corresponding output signal;

a beam splitter, disposed between the optical disk and the detector, provided with a first and a second surfaces, the first surface being pervious to the light beams having a wavelength other than the wavelength of the first light beam and the second surface being pervious to the light beam having a wavelength other than the wavelength of the second light beam, the first and the second surfaces arranged in such a way that they are inclined at a predetermined angle with respect to an optical axis formed by a center point of the detector and respective convergence points of the first and the second light beams, the convergence point of the first light beam referring to a point on the first recording surface on which the first light beam converges, and that of the second light beam referring to a point on the second recording surface on which the second light beam converges, wherein the first light beam from the first light source is reflected to the first recording surface of the optical disk by the first surface of the beam splitter, the first light beam reflected from the first recording surface travels toward the detector via the second surface of the beam splitter, the second light beam from the second light source is reflected to the second recording surface of the optical disk by the second surface of the beam splitter, the second light beam reflected by the second recording surface impinges onto the detector via the first surface of the beam splitter to thereby allow the detector to generate selectively a corresponding output signal in response to the information from each of the recording surfaces of the optical disk;

an objective lens, disposed between the beam splitter and the optical disk, for focusing each of the light beams from the beam splitter and for converging each of the light beams reflected from each of the first and the second recording surfaces onto the surfaces of the beam splitter, respectively; and a signal detection unit, connected to the photoelectric cells of the detector, for generating a focusing error signal by comparing the outputs from the photoelectric cells.

2. The optical pickup system of claim 1, wherein the predetermined angle is 45 degrees.

3. The optical pickup system of claim 1, wherein the second light source is turned off, while the first light source reproduces the information signal off the first recording surface of the optical disk.

4. The optical pickup system of claim 1, wherein the first light source is turned off, while the second light source reproduces information signal off the second recording surface of the optical disk.

5. An optical pickup system for reproducing an information signal stored on an optical disk including a first and a second recording surfaces, comprising:

a detector;

a pair of light sources for generating a first and a second light beam, respectively, each of the light beams having a different wavelength; and an optical means, provided with a first surface being transparent to the second light beam and reflective to the first light beam, and a second surface being transparent to the first light beam and reflective to the second light beam, wherein the first light beam from the first light source is reflected to the first recording surface of the optical disk by the first surface of the optical means, the first light beam reflected from the first recording surface travels toward the detector via the second surface of the optical means, the second light beam from the second light source is reflected to the second recording surface of the optical disk by the second surface of the optical means, the second light beam reflected by the second recording surface impinges onto the detector via the first surface of the optical means to thereby allow the detector to generate selectively a corresponding output signal in response to the information signal from each of the recording surfaces of the optical disk.

6. The optical pickup system of claim 5, further comprising an objective lens for focusing each of the light beams from the optical means and for converging each of the light beams reflected from each of the first and the second recording surfaces onto the surfaces of the optical means, respectively.

7. The optical pickup system of claim 6, wherein the first and the second surfaces of the optical means are arranged in such a way that they are inclined at a predetermined angle with respect to an optical axis formed by a center point of the detector and respective convergence points of the first and the second light beams, wherein the convergence point of the first light beam represents a point on the first recording surface on which the first light beam converges, and that of the second light beam represents a point on the second recording surface on which the second light beam converges.

8. The optical pickup system of claim 7, wherein the detector is provided with a pair of photoelectric cells, each of the photoelectric cells being capable of measuring a light beam intensity and generating a corresponding output signal.

9. The optical pickup system of claim 8, wherein the detector includes a signal detection unit, connected to the photoelectric cells of the detector, for generating a focusing error signal by comparing the outputs from the photoelectric cells.

10. The optical pickup system of claim 8, wherein the detector is placed facing the recording surfaces of the optical disk.

11. The optical pickup system of claim 10, wherein the optical means is disposed between the optical disk and the detector along the optical axis.

12. The optical pickup system of claim 11, wherein the objective lens is disposed between the optical means and the optical disk along the optical axis.

13. The optical pickup system of claim 12, wherein each of the light sources is placed facing each other with respect to the optical means.

14. An optical pickup system for reconstructing an information signal stored on an optical disk having first and second recording surfaces, said system comprising:

a first light source for generating a first light beam at a first wavelength and a second light source for generating a second light beam at a second wavelength, said wavelengths being different;

first and second reflecting surfaces arranged to reflect a portion of said first and second light beams toward said optical disk, a reflected portion of said first light beam impinging on, and reflecting off of the first recording surface when said first light source is on, and a reflected portion of the second light beam impinging on, and reflecting off of the second recording surface when the second light source is on; and a detector for sensing an intensity of light reflecting off said first and second recording surfaces, the intensity of light reflecting off said first and second recording surfaces being representative of an information signal stored on said recording surfaces.

15. The system of claim 14, wherein the first reflecting surface reflects light having said first wavelength and allows light of other wavelengths to pass through, and the second reflecting surface reflects light having said second wavelength and allows light of other wavelengths to pass through.

16. The system of claim 15, further comprising an objective lens interposed between the optical disk and the detector, wherein the objective lens focuses the reflected portions of the first and second light beams onto respective first and second recording surfaces, and converges light reflected off of the first and second recording surfaces onto the detector via the second and first reflecting surfaces, respectively.

17. The system of claim 14, wherein the first and second light sources face each other, the first and second reflecting surfaces are formed on a beam splitter positioned between the light sources, and the first reflecting surface is oriented at a 90° angle with respect to the second reflecting surface.

18. The system of claim 17, wherein the beam splitter is positioned along an optical axis between the optical disk and the detector, and an objective lens is positioned between the optical disk and the beam splitter.

19. The system of claim 14, wherein the detector comprises adjacent first and second photoelectric cells, each of which measures a light intensity reflected from the optical disk, and a signal detection unit electrically connected to the photoelectric cells, the signal detection unit comparing the measured light intensities and outputting an error signal reflective of a difference in the measured light intensities.

* * * * *